May 26, 1931.                F. C. RYDER                1,807,256
                             GLARE SHIELD
                         Filed Oct. 23, 1928          3 Sheets-Sheet 1
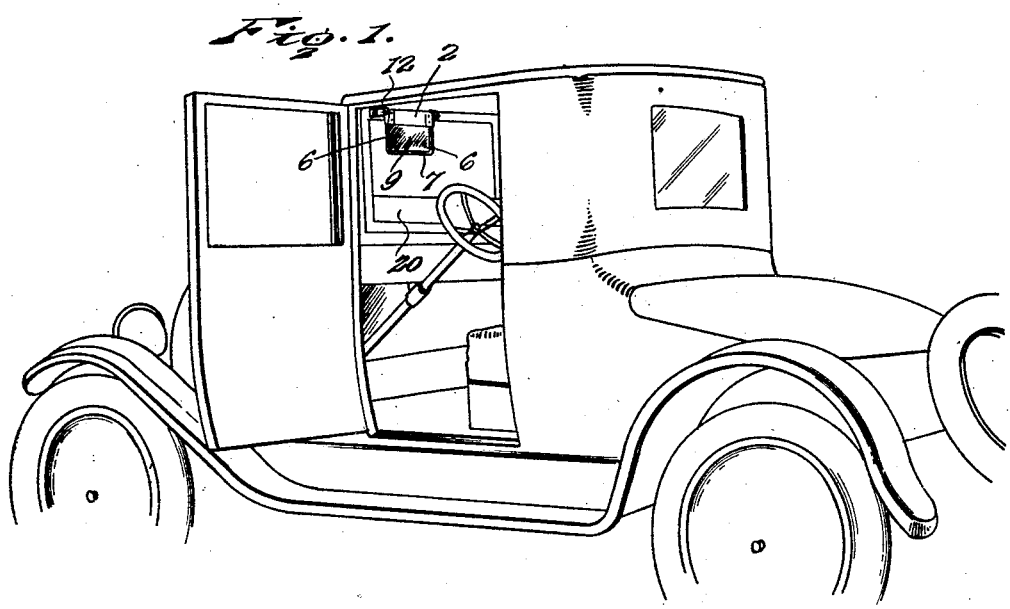
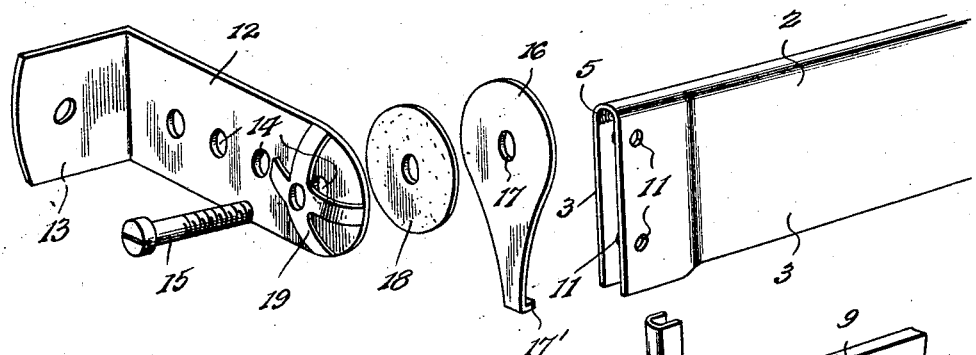
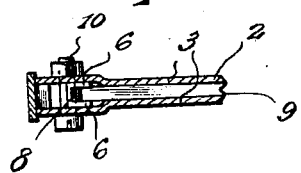
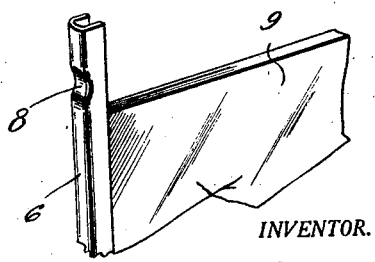
INVENTOR.
F. C. Ryder.
BY
Lacey & Lacey, ATTORNEYS.

May 26, 1931.　　　　F. C. RYDER　　　　1,807,256
GLARE SHIELD
Filed Oct. 23, 1928　　　3 Sheets-Sheet 2
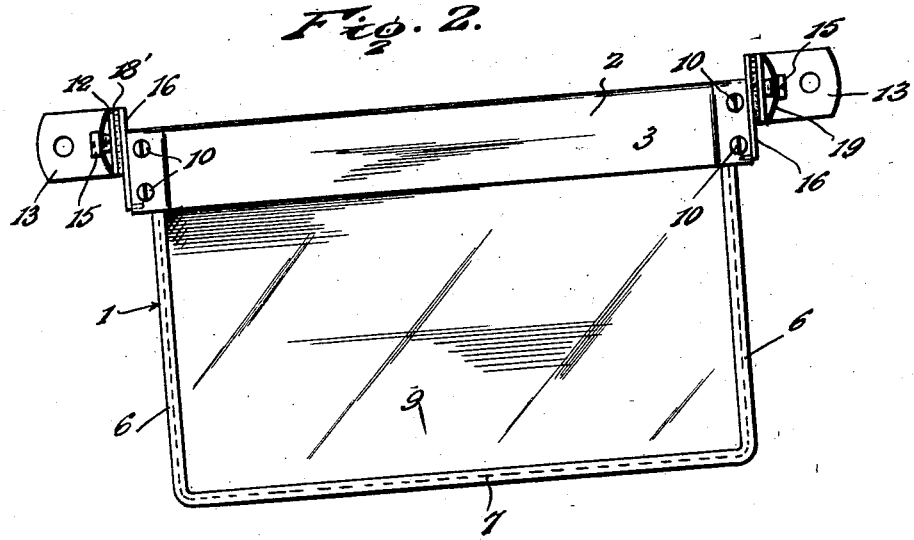
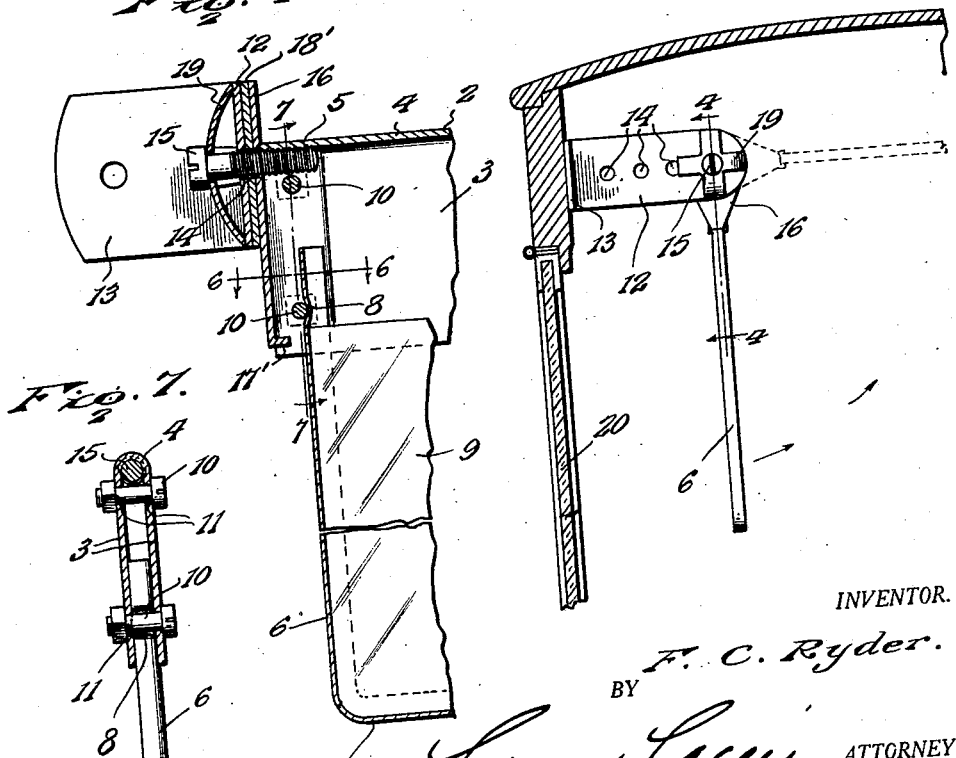
INVENTOR.
F. C. Ryder.
BY Lacey & Lacey, ATTORNEYS May 26, 1931.  F. C. RYDER  1,807,256
GLARE SHIELD
Filed Oct. 23, 1928  3 Sheets-Sheet 3

Inventor
F. C. Ryder.
By Lacey, Lacey, Attorneys

Patented May 26, 1931

1,807,256

UNITED STATES PATENT OFFICE

FOREST C. RYDER, OF ELGIN, OREGON, ASSIGNOR TO RYDER ANTI-GLARE SHIELD CO., OF ELGIN, OREGON

GLARE SHIELD

Application filed October 23, 1928. Serial No. 314,446.

The present invention is directed to improvements in glare shields for attachment to or above the windshields of automobiles or the like.

The primary object of the invention is to provide a device of this character so constructed that it can be easily and quickly applied to or above the windshield of an automobile and adjusted in various positions to suit the convenience of the driver.

Another object of the invention is to provide a device of this character which consists of a very few parts, said parts being compactly and adjustably arranged.

Another object of the invention is to provide a glare shield which is efficient in operation, durable, and one which can be manufactured at a very small cost.

Another and important object of the invention is to provide a glare shield which can be so adjusted that the driver will be enabled to see the right hand side of the roadway, which is especially desirable even though the rays of approaching headlights are diffused by the shield.

Another object of the invention is to provide a glare shield constructed in such manner that it can be conveniently swung to its inoperative position for day light driving.

With these and other objects in view, this invention resides in the novel features of construction, formation, combination and arrangement of parts to be hereinafter more fully described, claimed and illustrated in the accompanying drawings, in which:—

Figure 1 is a perspective view of the device showing it in place on a closed car.

Figure 2 is a rear view of the shield removed from the vehicle.

Figure 3 is a side elevation of the device showing it in place in an automobile, the automobile being shown in section.

Figure 4 is a sectional view on line 4—4 of Figure 3.

Figure 5 is a perspective view of the parts before being assembled.

Figure 6 is a sectional view on line 6—6 of Figure 4.

Figure 7 is a sectional view on line 7—7 of Figure 4.

Figure 8:
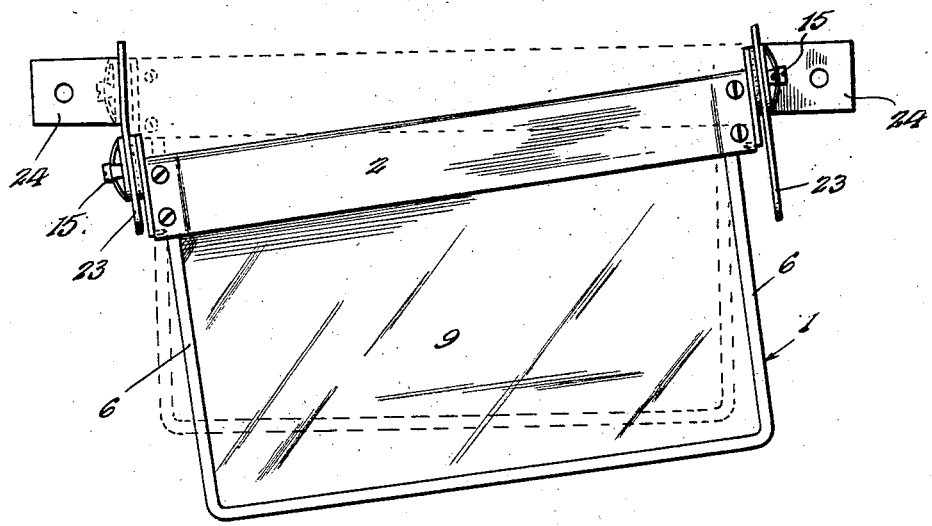
Figure 8 is a rear view of a modified form of the invention.

Referring to the drawings, 1 designates a frame which consists of a top bar 2 formed from sheet metal and bent to provide plates 3 connected at their upper edges by a curved web 4 which maintains the plates in spaced relation. The ends of the bar are threaded as at 5, the purpose of which will later appear.

The side bars 6 of the frame are integrally connected at their lower ends by a cross bar 7, said bars being formed from sheet metal and are of channel formation. The side bars 6 are provided near their upper ends with transverse recesses 8, the purpose of which will later be explained.

A glass panel 9, or panel of other suitable material, is provided and has its side edges and lower edges confined snugly within the channels of the side bars 6 and cross bar 7, said panel being of any suitable color, or a color which will diffuse the light rays of approaching vehicles for night driving or the sun for day driving.

In order to firmly connect the side bars 6 to the bar 2 clamping bolts 10 are passed through vertically spaced openings 11 formed in the plates 3, the lowermost bolt engaging in the recesses 8 which will obviously hold the side bars against slipping.

In order to support the frame 1 a pair of brackets 12 are employed and have their forward ends provided with flanges 13 for attachment to the upper rail or above the upper rail of the windshield of the vehicle, whether of the open or closed type. These brackets are provided with a plurality of perforations 14 in which are selectively engaged the bolts 15, said bolts being adapted to be threaded into engagement with the threads 5. Interposed between the ends of the bar 2 and brackets 12 are plates 16 having openings 17 formed therein for the passage of the bolts 15, said plates having lugs 17' for engagement between the plates 3.

Interposed between the brackets and plates are washers 18 of hard rubber fibre or the like, which serve in conjunction with the resilient washers 19 to hold the frame 1 firmly in its operative or inoperative position.

Obviously the frame can be swung to a position as indicated in dotted lines in Figure 3 so as to be out of the way when not in use, said frame being held in either of its positions by the tension of resilient washers 19. For driving against the sun or other glare in daytime, or against headlights of other cars at night the frame is of course lowered into parallel relation with the windshield 20 and in line of vision of the driver.

Figure 9:
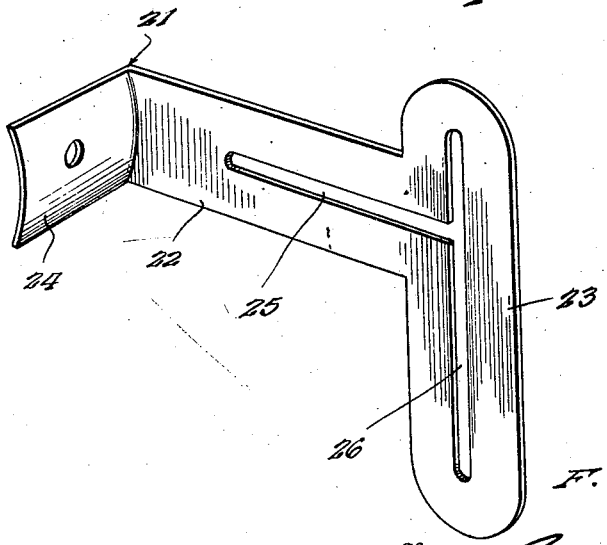
Figure 9 is a perspective view of the bracket used in connection with the modified form.

In the modified form of the invention, as shown in Figures 8 and 9, the frame 1 is supported by brackets 21 which include horizontal arms 22 and vertical arms 23, the latter arms having carried thereby angularly disposed transversely curved flanges 24 adapted to be firmly secured to the top or above the top rail of the windshield 20. The brackets are formed from resilient sheet metal, preferably steel, in order that the inherent resiliency thereof will permit slight bending or springing thereof when the frame is adjusted for the purpose to be hereinafter explained. The arms 22 have longitudinal slots 25 formed therein which open into the vertical slots 26 formed in the vertical arms 23. It will be of course understood that the bolts 15 are slidable in the slots 25 and 26 of the respective arms, as the occasion may require. For instance, the bolts 15 may be moved backwardly and forwardly in the slots 25 to regulate the distance of the frame from the driver, and can be moved upwardly or downwardly in the slots 26 to adjust the frame vertically. These brackets may be used with or without slots 25.

The slots 26 not only permit the vertical adjustment of the frame, but the construction is such that said frame can be tilted in order that the left hand corner thereof will be positioned below the right hand corner, thereby holding the panel 9 in a position to permit the driver to see under the right hand corner of the shield to observe the right hand side of the roadway, while approaching the sun or glaring lights.

In order to tilt the frame it is not necessary to loosen the bolts 15 upon either side of the frame, as the frame can be pulled downwardly at the left corner or pushed upon the right corner without readjusting said bolts 15, the inherent resiliency of the brackets permitting them to flex slightly to accommodate the tilting of the frame. The frame can be tilted downward or raised and held at any position by mere movement of the hand of the driver without any readjustment.

From the foregoing, it is thought that the construction, operation and many advantages, of the herein described invention will be apparent to those skilled in the art, without further description, and it will be understood that various changes in the size, shape, and proportion and minor details of construction may be resorted to without departing from the spirit or sacrificing any of the advantages of the invention.

What is claimed is:

1. A glare shield comprising a pair of brackets formed of resilient sheet metal and each having a horizontal shank bent adjacent one end to form a support engaging side flange and a vertically disposed arm at the other end of the shank, the arm being formed with a longitudinally extending slot, a frame, a transparent panel mounted in said frame, said frame having an upper bar extended at its ends beyond sides of the frame, plates at the ends of the upper bar projecting upwardly therefrom, friction washers between said plates and brackets, screws to pivotally and slidably mount said frame passed through the slots to said brackets and through said washers and having heads at their outer ends, and resilient washers upon said screws between their heads and said brackets.

2. A glare shield comprising a pair of brackets formed of resilient sheet metal and each having a horizontal shank bent adjacent one end to form a support engaging side flange and a vertically disposed arm at the other end of the shank extending above and below the shank, the arm being formed with a longitudinally extending slot and the shank with a longitudinally extending slot intersecting the slot of the arm intermediate the ends thereof, a frame between said brackets, a transparent sheet carried by said frame, pivots passed through the slots of said brackets and engaged with upper corner portions of said frame to slidably and pivotally mount the frame, and means to hold the frame in a set position.

In testimony whereof I affix my signature.

FOREST C. RYDER. [L. S.]